L. A. DEGGINGER.
EGG CARRIER.
APPLICATION FILED JUNE 17, 1914. RENEWED DEC. 6, 1916.
1,227,250.
Patented May 22, 1917.
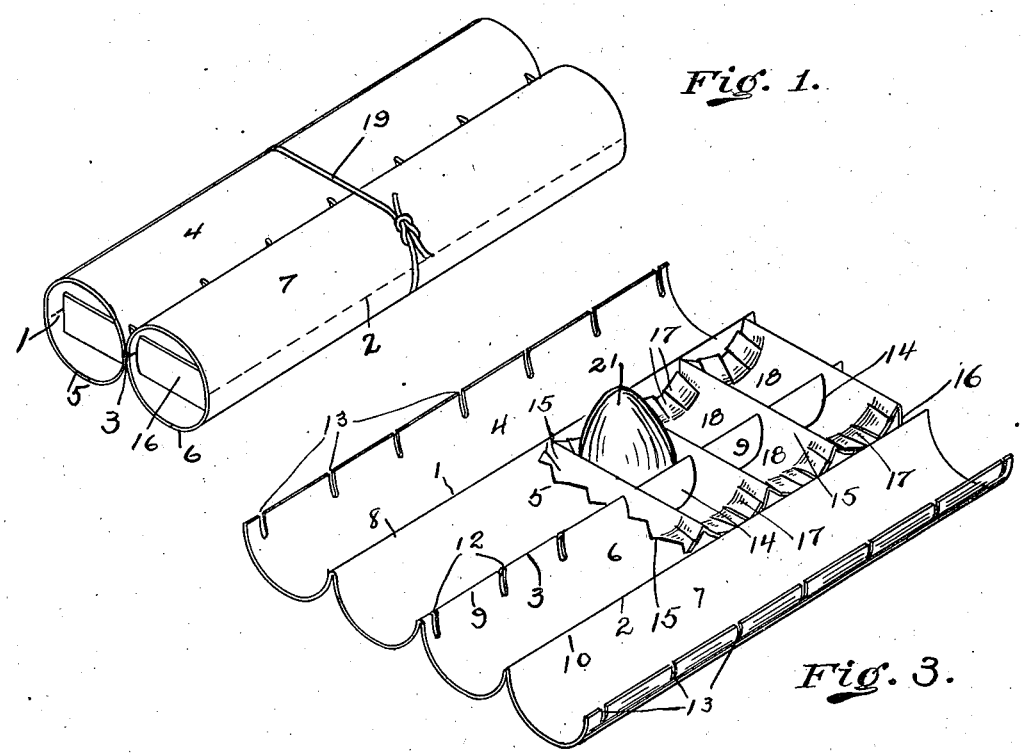
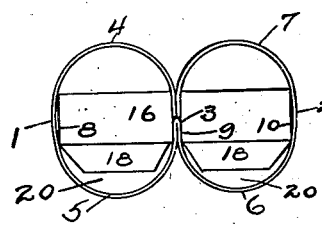
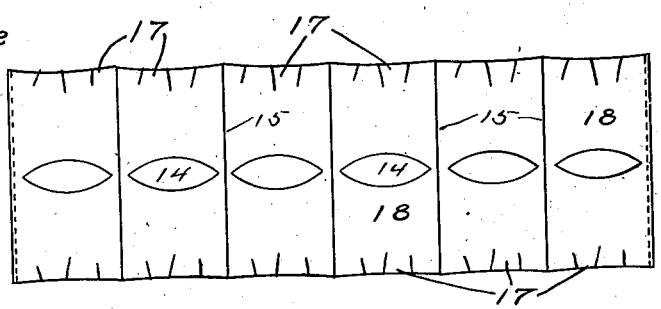

UNITED STATES PATENT OFFICE.

LOUIS A. DEGGINGER, OF COVINGTON, KENTUCKY, ASSIGNOR TO THE NO-BREAK EGG CARRIER CO., OF CINCINNATI, OHIO, A CORPORATION OF OHIO.

EGG-CARRIER.

1,227,250.  Specification of Letters Patent.  Patented May 22, 1917.

Application filed June 17, 1914, Serial No. 845,739. Renewed December 6, 1916. Serial No. 135,486.

*To all whom it may concern:*

Be it known that I, LOUIS A. DEGGINGER, a citizen of the United States, residing at the city of Covington, in the county of Kenton and State of Kentucky, have invented certain new and useful Improvements in Egg-Carriers, of which the following is a specification.

The object of my present invention is to produce a cheap, simple and efficient egg carrier, which can be used for holding a given number of eggs and then placed in varying numbers into the egg crates now used to be shipped from one point to another and the egg carriers then taken out of the crates and sold at retail as needed; further it can be used for taking the eggs out of a bulk carrying package and the eggs sold in a retail way; and still further, the egg carrier can be used in sending eggs by mail through parcel post delivery.

One of the salient features of this invention consists in means for suspending the eggs and cushioning them at the same time, in an unique, novel and highly efficient manner, so that the eggs will ride in pockets suspended and cushioned.

Another feature consists in forming the egg carrier of arches and braces so that when together it will withstand outside pressure and its parts become interlocked to form a carrier for eggs which will not readily become weakened at any point but remain intact and in an original normal condition under rough usage.

Its other advantages and features will readily become apparent from the following specification.

In the accompanying drawing forming part of this specification:

Figure (1) is an isometric view of the egg carrier,

Fig. (2) is an end view of the egg carrier,

Fig. (3) is a perspective view of the egg carrier, opened up, part of the egg tray being removed, and Fig. (4) is a view of the egg tray.

The body of the carrier is formed of a sheet of card board or other suitable or equivalent material creased at 1, 2, 3, and between the creases and on the sides of the outer creases, depressed or rolled to form semi-circular or semi-annular elongated half tubes 4, 5, 6, 7; walls 8, 9 and 10 formed between them where the creases are present, the wall 9 being rigid and stiff, the side walls 8 and 10 being loosely joined at the creases 1 and 2 so that the end semi-circular half tubes, which in this instance, form lids, will swing on said creased joints, to open or close over the half tubes 5 and 6. It will thus be seen that the half tubes 5 and 6 together form the lower half of the carrier and the end parts 4 and 7 form the hinged lids for putting over halves 5 and 6 to form the egg carrier body.

In the central wall 9, I cut depressions or recesses 12. On the outer edges of the halves 4 and 7 I cut the locking recess 13. I may make these halves which form the body of the carrier of any other shape or contour and have the parts fold together in any other equivalent or desirable manner.

The egg tray which fits into this body and is supported thereby is made as follows: the tray is cut out of a rectangular sheet and formed with elongated slots or openings 14. At the points where the recesses 12 are present the egg tray is folded to form walls as 15 and these walls pass down into the recesses 12 and are firmly held in position by tightly fitting therein, the slots 14 passing down on one side of the wall 9 so that the walls 15 can pass down into said recesses 12.

At each end of the tray the walls 15 are folded so that on the outer part a short end wall 16 is formed, to protect the eggs at each end and to stiffen and strengthen the ends of the egg tray. Between each wall the pockets for holding the eggs are formed, the eggs being held in normal position by fingers 17 cut into the outer edges of the egg tray where the pockets are present; the pockets being marked 18. The slots or openings 14 also assist in forming the pockets.

When the egg carrier is to be closed, the ends or lids 4 and 5 are swung over the halves 5 and 6 and the locking recesses 13 pass over the walls 15 and hold the parts tightly together. A string or other fastening device 19 may be used to more permanently unite the parts together.

The egg tray is suspended on the wall 9 as it will be seen that the egg tray does not touch the bottom of the halves 5 and 6 a space 20 being left, so that the eggs 21 will be held in suspension in pockets 18 and cushioned by the slots 14 and fingers 17, cutting down the breakage of eggs to the minimum. The pocket formed is approximately the shape of the egg and will thus support it properly. I properly pocket and cushion the egg and carry it safely in transportation.

The egg tray and the walls of the half parts all go to make up the pocket for housing the eggs.

It will be seen that this egg carrier is braced and supported from every point and will retain an original and normal position and form.

While I have described one specific form of construction for my new egg carrier, it will readily become apparent that it is capable of being modified and changed without departure from the principle and spirit of my invention and I desire to be understood as claiming that such modifications still will fall within the scope of my invention.

What I claim as new and my invention, and desire to secure by Letters Patent is:

1. In an egg carrier of the class described, a body portion made of a series of elongated half sections, joined together and capable of being folded together, an egg carrying tray, said egg carrying tray provided with a series of central elongated slots, which slots fit over, when the tray is folded, the meeting edges of the two middle halves enabling the tray to be suspended and supported in the body portion so that a space will be provided between the tray and the bottom.

2. In an egg carrier of the class described, a body portion made of a series of elongated half sections, joined together, capable of being folded together, the meeting edges of the inner halves provided with recesses, an egg carrying tray having elongated central slots and folded together to fit the recesses, the slots enabling the tray to straddle the inner halves, and held thereby in a suspended position so that the bottom of said egg carrying tray will not reach the bottom of the body portion and thus leave a space.

3. In an egg carrier of the class described, a body portion made of a series of elongated half sections, joined together, capable of being folded together, the meeting edges of the inner halves provided with recesses, an egg carrying tray having elongated central slots and folded together to fit the recesses, fingers at the edge of said egg tray, the slots enabling the tray to straddle the inner halves, and held thereby in a suspended position so that the bottom of said egg carrying tray, will be suspended above the bottom of the body portion and leave a space therebetween.

In testimony whereof I affix my signature in presence of two witnesses.

LOUIS A. DEGGINGER.

Witnesses:
H. E. CARSTENS,
L. M. DUNLAP.